UNITED STATES PATENT OFFICE.

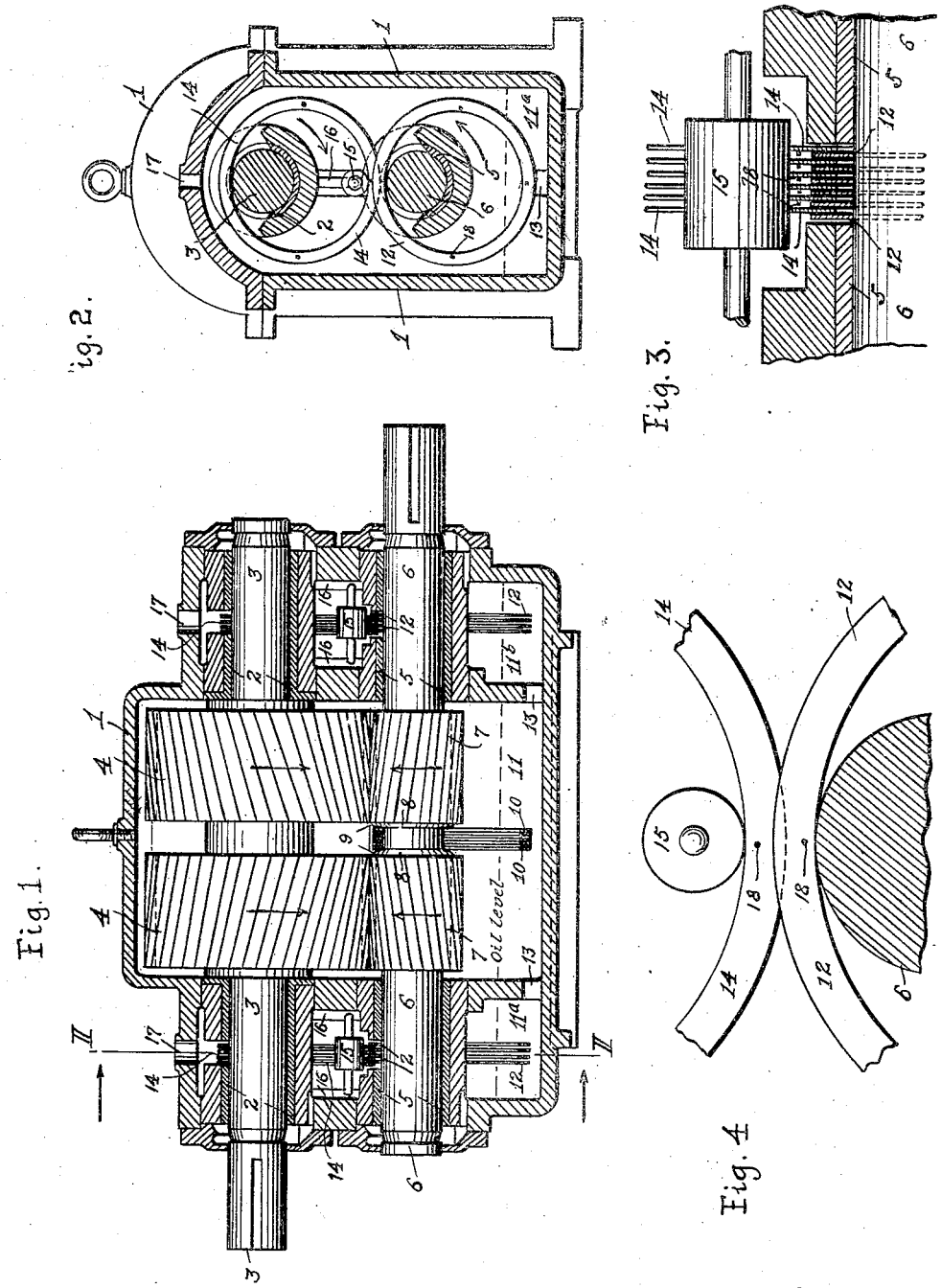

CHARLES VOLNEY KERR, OF WELLSVILLE, NEW YORK.

SELF-OILING BEARING.

1,101,191. Specification of Letters Patent. Patented June 23, 1914.

Application filed August 23, 1913. Serial No. 786,267.

*To all whom it may concern:*

Be it known that I, CHARLES V. KERR, a citizen of the United States, residing at Wellsville, in the county of Allegany and State of New York, have invented certain new and useful Improvements in Self-Oiling Bearings, of which the following is a specification.

My invention relates to self oiling of multiple bearings, and is particularly adapted for the lubrication of a plurality of bearings and shafts which are superposed in a gear mechanism, said gears being used to reduce the speed of a steam turbine, electric motor, or other high speed motor connected with a slower rotary speed blower, pump, or other apparatus.

The object of the invention is to provide an efficient and automatic lubrication of two or more superposed rapidly revolving shafts which will keep a constant circulation and a flow of the lubricant to each of the several bearings and shafts which will be commensurate with the speed of the rapidly revolving shafts.

A further object of the invention is to provide means for the lubrication of a plurality of bearings in which one reservoir for the oil only is employed, and the plurality of superposed bearings are supplied from this one reservoir by the oil being relayed from the reservoir successively to the several bearings by a series of superposed and co-acting flat rings.

Other objects and advantages of the invention will appear from the detailed description and mode of operation.

The invention consists of structural features and relative arrangements of the several elements which will be hereinafter more fully described and particularly pointed out in the appended claims.

In the drawings, in which similar reference characters indicate the same parts in the several figures of drawing; Figure 1, is a longitudinal section of a gear casing and bearings showing the invention applied thereto; Fig. 2 is a section on line II—II of Fig. 1; Fig. 3 is a fragmentary and enlarged section of Fig. 1 showing the relation of the superposed lubricating rings with one of the bearings; and Fig. 4 is a similar view of Fig. 2 showing the relation of the superposed rings with one of the bearings.

Referring to the drawings, 1 is any suitable gear casing which is provided with any approved form of upper bearings 2, 2, in which is supported a low speed or driven shaft 3, having keyed thereon separated gears 4, 4, said shaft 3 being connected by any approved means to a blower, pump or similar apparatus, not shown. Lower bearings 5, 5, support a rapidly rotating shaft 6, which is connected to any form of high speed turbine or other motor, not shown, said shaft 6 carrying gears 7, 7, which mesh with the gears 4, 4, as shown. The gears 7, 7, are separated and provided at their inner or adjacent sides with small projections or shoulders 8, having preferably rounded edges 9. In the space between the shoulders 8, 8, and supported by the shaft 6, between the gears 7, 7, are provided preferably a series of independent flat lubricating rings 10, 10, whose lower sections dip into the oil contained in the reservoir 11, at the bottom of the gear casing 1, and carry the oil to and distribute the same sidewise on the working or engaging faces of the teeth of gears 4, 4 and 7, 7, which rotate in the direction indicated by the arrows.

The essential features of the present invention are in providing the bearings 5 to be lubricated, with a series of separated flat rings 12, 12, which rest on the top surface of the lower shaft 6, as shown, while their lower sections dip into the lateral reservoirs 11ª, and 11ᵇ connected with the main reservoir 11 by means of the openings 13, as indicated. Said rings 12, 12 are stamped from zinc or other non-corrosive metal and spaced apart by small wires or projections 18, attached to the side of the rings and parallel to the axis of the shaft 6, as shown in Figs. 3 and 4.

Rings 14, 14, similar in construction to the lubricating rings 12, 12, are supported and carried by the superposed shaft 3, and are so proportioned in diameter that their lower sections will be free from the shaft 6, and alternately disposed with respect to the upper sections of the lubricating rings 12, 12, as shown. A roller 15 having projecting pins guided in ways 16 rests on the inner sides of the rings 14, 14, for the purpose of preventing the upper rings 14, 14, from getting out of mesh with the lower rings 12, 12.

The top of the casing is provided with openings 17 for the purpose of introducing the lubricating oil into the casing to be deposited in the lateral reservoirs 11ª and and flow therefrom into the middle reservoir 11, by means of the openings 13, the openings 17 also enabling one to observe whether the lubricating rings 12 and 14 are properly coöperating and performing their functions, to insure a copious and continuous supply of oil to the bearings 2 and 5, and shafts 3 and 6.

The operation of the invention is as follows: The superposed shafts 3 and 6 being rotated in the direction as indicated by the arrows, by the interposed and meshing gears 4 and 7, the lower rings 12, 12 are rotated by means of the shaft 6 and bring up the oil adhering to said rings to the upper side of the shaft 6 from either of the reservoirs 11ᵃ or 11ᵇ, and a portion of this elevated oil is deposited on the bearings 5, 5. The lower sections of the upper rings 14, 14, rotated by the shaft 3 and interposed between and meshing with the upper sections of lower rings 12, 12 come in contact with and take up part of the oil clinging to said rings 12, 12 and relay said oil to the upper bearings 2, 2 in proper portion and commensurate to the speed of the shaft 3. It has been found that owing to the larger diameter of the rings 12, 12, or higher speed of rotation of the shaft 6, the lower rings 12, 12 bring up more oil than is needed for the lower bearing 5, and hence by the arrangement as shown, a copious supply of oil is always supplied to the upper bearing 2, and it can be readily seen and understood that the diameter and depth of said annular sections of the intermeshing lubricating rings 12 and 14 can be easily determined, to supply the necessary lubricating fluids to a series of superposed shafts and bearings, and while I have shown and described only two such superposed bearings, I do not limit myself to such number, as three or more bearings or shafts could be lubricated in a similar manner, and involving the same invention in which the lubricating fluid is relayed from one ring or set of rings to another superposed and contacting ring or set of rings, without departing from the gist of my invention.

From the foregoing disclosure of construction and mode of operation, it will be seen that oil can be easily, continuously and quickly conveyed from a reservoir to a number of superposed shafts or bearings, and all the bearings and gears in a gear casing can be supplied from a single reservoir at the bottom of the casing.

While I have shown and described a specific form and arrangement for lubricating the sets of gears 4, 4, and 7, 7, which transmit the motion of the high speed rotary shaft 6 to the shaft 3 from the same oil reservoir as that which supplies the lubricant to the bearings 2, 2, and 5, 5, for the said shafts 3, and 6, within the same gear casing, I do not herein make claim to this feature of the invention, as this is the subject-matter of a separate application filed by me on August 23, 1913, and Serial No. 786,266.

What I claim is:—

1. A self oiling multiple bearing comprising a plurality of bearings one above the other, rotary shafts in each of said bearings, a lubricating ring surrounding and supported from each of the shafts at the bearing and rotated by the shafts, an oil reservoir, said lubricating rings so proportioned and arranged that the lower portion of the lower ring dips into the oil reservoir, and the upper portion of the lower ring of any adjacent pair of superposed rings is contiguous to the lower portion of the upper ring of the pair.

2. A self oiling multiple bearing comprising a plurality of bearings one above the other, rotary shafts in each of said bearings, a plurality of annular disks surrounding and supported from each of the shafts at the bearing and rotated by the shafts, an oil reservoir, said disks so proportioned and arranged that the lower portions of the lower disks dip into the oil reservoir, and the upper portions of the lower disks of any adjacent pair of superposed disks are contiguous to the lower portions of the upper disks of the pair.

3. A self oiling multiple bearing comprising a plurality of bearings one above the other, rotary shafts in each of said bearings, a plurality of separated annular disks surrounding and supported from each of the shafts at the bearing and rotated by the shafts, an oil reservoir, said disks so proportioned and arranged that the lower portions of the lower disks dip into the oil reservoir, and the upper portions of the lower disks of any adjacent pair of superposed disks intermesh with and are contiguous to the lower portions of the upper disks of the pair.

4. A self oiling multiple bearing comprising a plurality of bearings one above the other, rotary shafts in each of said bearings, a plurality of separated annular disks surrounding and supported from each of the shafts at the bearing and rotated by the shafts, an oil reservoir, said disks so proportioned and arranged that the lower portions of the lower disks dip into the oil reservoir, and the upper portions of the lower disks of any adjacent pair of superposed disks intermesh with and are contiguous to the lower portions of the upper disks of the pair, and a roller resting on the lower inner section of the upper disks.

5. A self oiling multiple bearing comprising a plurality of bearings one above the other, rotary shafts in each of said bearings, a plurality of separated annular disks surrounding and supported from each of the shafts at the bearing and rotated by the shafts, an oil reservoir, means connected with the disks for separating them, said disks so proportioned and arranged that the lower portions of the lower disks dip into the oil reservoir, and the upper portions of the lower disks of any adjacent pair of superposed disks intermesh with and are contiguous to the lower portions of the upper disks of the pair.

In testimony whereof I affix my signature in presence of two witnesses.

CHARLES VOLNEY KERR.

Witnesses:
VOLNEY A. KERR,
ELIZABETH A. KERR.